March 18, 1952     H. F. WATERS     2,589,756
HEAT-SEALING MACHINE
Filed June 10, 1949     2 SHEETS—SHEET 1
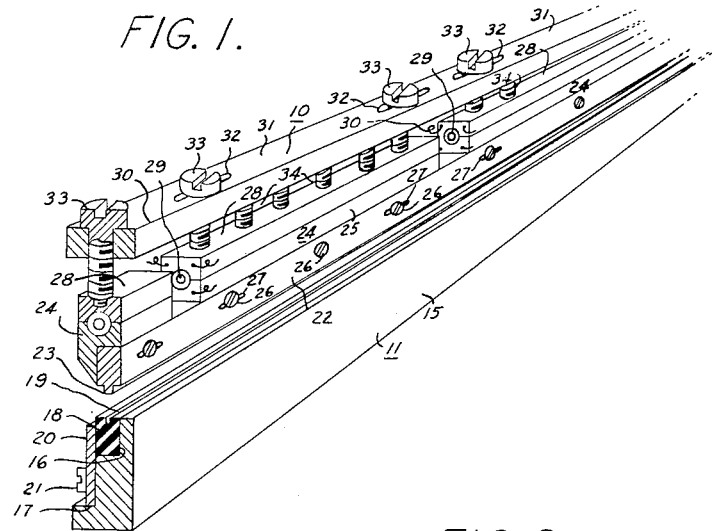
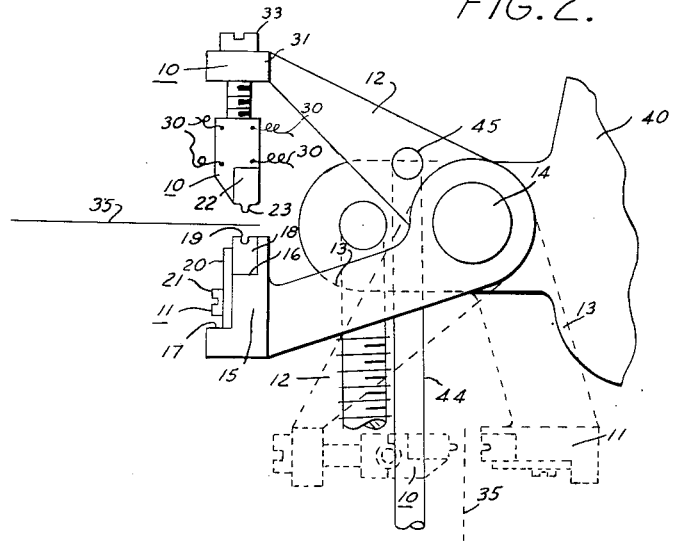
INVENTOR.
HARRY F. WATERS
BY John M. Crane
Attorney

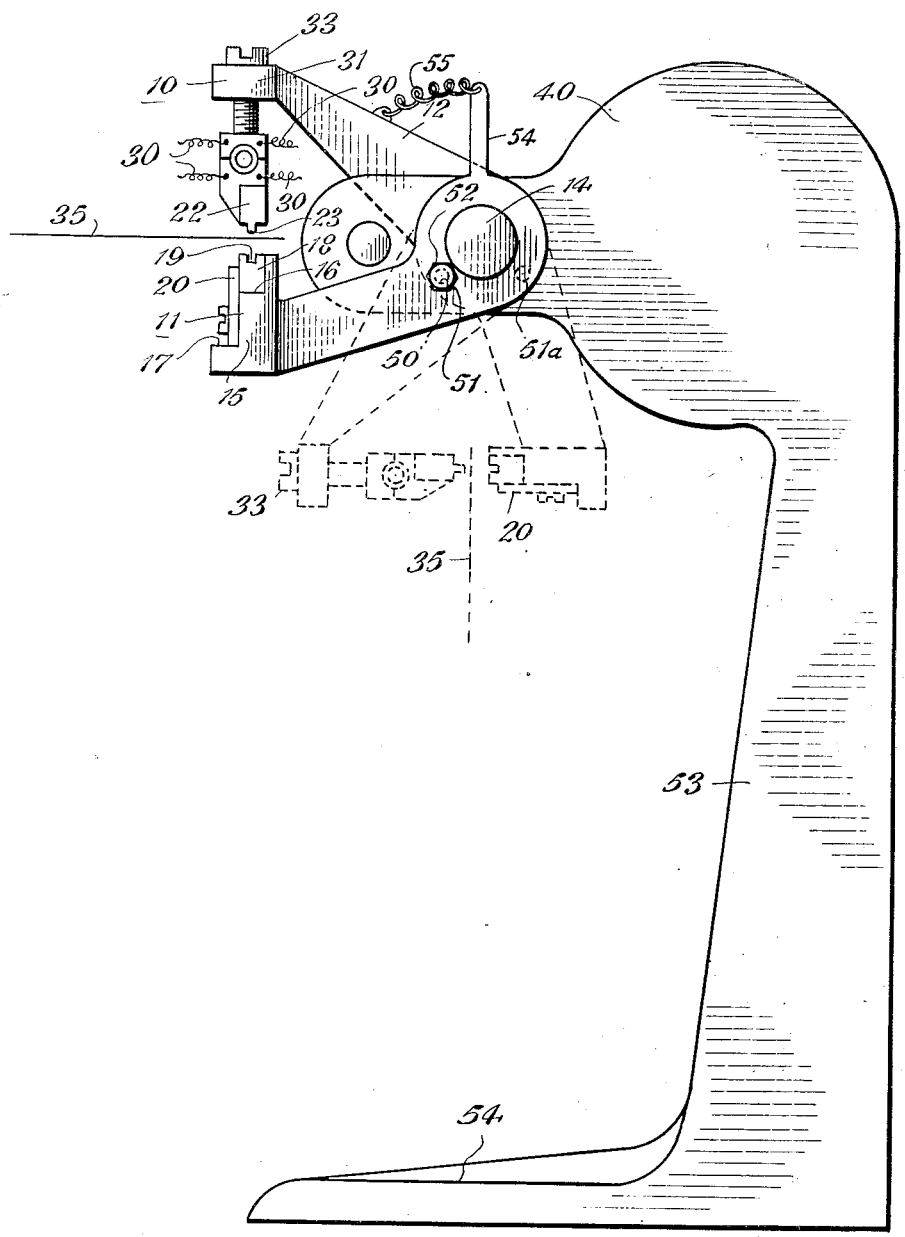

Patented Mar. 18, 1952

2,589,756

UNITED STATES PATENT OFFICE 2,589,756

HEAT-SEALING MACHINE

Harry F. Waters, New York, N. Y.

Application June 10, 1949, Serial No. 98,364

5 Claims. (Cl. 154—42)

This invention relates to improvements in heat-sealing machines and more particularly to universally adjustable heat-sealing jaws having multiple heat-sealing units.

In my prior patents and applications, Patents 2,239,133, of April 22, 1941; 2,262,480, of November 11, 1941; 2,125,758, of August 2, 1938; 2,220,873, of November 5, 1940; 2,252,105, of August 12, 1941, there are disclosed heat-sealing machines and devices which are particularly adapted for forming fin-seal seams and closures in thermoplastic bag materials. Essentially, my prior developments were directed to the preparation and forming of relatively small bag structures, a particular feature of such formation being the use of substantially unitary heating units formed in and with the heating bars of the thermal sealing machines. Usually such machines were fixed as to mode of operation and type of structure and particularly the sealing jaw structure. With such constructions there was an undesirable limitation in the size of bags which could be formed from heat sealable material in my prior heat-sealing machines.

I have now found that heat-sealed bags can be made in any size by utilizing novel, universally adjustable, heat-sealing and clamping jaws in a heat-sealing machine, in which uniformity of heat distribution along the heating bar is effected by using a plurality of heating units, severally adjustable along and on a common, multiple length heating bar. The novel heating unit and universally adjustable sealing jaws may be mounted on a simple stand with the heating jaws extending over an edge thereof and adjustable to a lateral, horizontal operating position, or a depending, vertical operating position or to any position between the vertical and horizontal. In the vertical position the sealing device may be associated with a delivery track to effect the mouth sealing of large cartons and packages.

The novel improvements of the present invention are described herein and illustrated in the drawings, a certain preferred embodiment of heat-sealing jaws being shown by way of illustration only, for, since such jaws may be incorporated in a variety of supporting structures, it is not intended to be limited to any specific associated structure except as such limitations are clearly imposed by the appended claims.

In the drawings like numerals refer to similar parts throughout the several views, of which Fig. 1 is an elevation of a pair of heat-sealing jaws, and Fig. 2 is an end view of the jaws of Fig. 1 mounted on supports, the vertical operating position being shown in dotted lines.

Fig. 3 is similar to Fig. 2 but shows the means for maintaining the jaws in vertical, horizontal or any intermediate position.

Considering the drawings more specifically there is shown a pair of upper and lower jaws 10 and 11. The jaws are mounted (as illustrated) on their main supports 12, 13, which are mounted for rotation on shaft 14, supported on any standard or machine base. The main jaw supports 12, 13 are located about the shaft 14 as shown in Fig. 2. The lower member or jaw 11 comprises a continuous bar member 15 having an upper step 16 and a lower step 17 formed on its outer surface. A resilient anvil 18 having a central slot or groove 19 is mounted on step 16 and held in place by plate 20 which member is adapted to seat on step 17 and be secured to the bar 15 by a plurality of securing members such as machine screws 21.

The cooperating jaw 10 comprises a continuous facing bar 22 having a continuous tongue 23 adapted to fit into groove 19 of the anvil. This facing bar is detachably secured to jaw 10 by screws 26.

Of course, it should be understood that, while I have illustrated the means for detachably securing the facing bar 22 to heating member 24 as a plurality of spaced screws, I can so secure said bar by any standard fastening means.

On the bar 22 are secured a plurality of heating members 24, comprising L-shaped bottom segments 25 secured to the member 22 by screws 26. The several heating members 24 have the central screws fixed to member 22. Member 22 is slotted, as indicated at 27, to permit the screws to move laterally with the expansion and contraction of the separate heating units. Top sections 28 of the heating elements are secured on and over the bottom sections 25 and both are grooved to receive heating elements designated generally by 29. Current leads 30 are provided for the several units. These leads may be connected to current sources in any suitable manner. A cross bar 31 is secured on jaw support 12 of the jaw mechanism. The bar 31 is provided with a series of slots 32 to receive machine screws 33 in sliding engagement, the latter being fixedly secured in and on the members 28 of the heating elements. Stub screws 34 are secured to the tops of members 28, in and between the fixed screws 33, the heighth of the stub screws being adjusted to control the travel of bar 31, to and from member 28, so as to provide the proper contact or "dwell" of the heating bar in contact with the bag or sheet 35 which is being operated on.

In operation, the bag or sheet 35 is introduced between the jaws 10 and 11, and the latter forced together. As shown, this is done by the rod 44, which is connected to the movable jaw support 12 at 45, the lower end of the rod being connected as usual with a foot treadle (not shown). Due to the use of multiple heating units, the heating bar is uniformly heated along its entire length, with the result that a uniform seal or seam is effected in the bag or envelope, no matter what the length of the seam. When the operating bar 31 is lowered it contacts the spacing screws 34 and forces the bar 22 into operating position in and on the resilient anvil 18. When the heat-sealing has been completed the jaw support 12 raises the bar 31 upwardly into contact with fixed screws 33 and thereby raises the heating bar 22 up from its sealing position. During the travel of the bar 31 from the studs 34 to the screws 33 the heating bar 22 remains in operating contact with the parts to be sealed and insures a proper and efficient seal.

Referring now to Fig. 3 it will be seen that I have provided means for maintaining the jaw supports 12 and 13 in horizontal operating position as well as in vertical operating position.

Such means are illustrated by a plurality of apertures 51 and 51a provided in supporting arm 40. Associated with said apertures is a companion aperture 52 provided in jaw support 13.

When the jaw support 13 is in horizontal operating position it will be seen that aperture 52 is aligned with aperture 51 so that a locking device, such as a bolt and nut combination 50, can secure the jaw supports 12 and 13 in horizontal operating position. The bolt is inserted through apertures 51 and 52 and the nut is fastened thereon by threading.

The supporting arm 40 of support 53 is positioned between the jaw support 13 and the jaw support 12. The jaw support 12 is supported on the opposite side of support arm 40 from the jaw support 13 and is sufficiently spaced therefrom so as not to strike or come in contact with the nut and bolt locking device which extends through aperture 52 of the jaw support 13 and aperture 51 of the support arm 40.

When the bolt is thus inserted through these apertures and the nut 50 threaded thereon the jaw supports 12 and 13 are thus locked in horizontal operating position.

It will be noted that while I have secured jaw support 13 in a moveably fixed position that jaw support 12 is moveably spaced from jaw support 13. In order to accomplish this I provide means on jaw support 13 such as a fixed post 54 to which a spring 55 is attached at one of its ends with the other end of the spring being attached in any standard manner, such as the provision of an aperture in the jaw support 12 with the end of the spring hooked thereto, to the jaw support 13.

In this manner the jaw supports 12 and 13 are, when in non-operating position maintained opened or in spaced relationship, but capable of being closed.

When it is desired to position the jaw supports in vertical operating position all that is necessary is to remove nut and bolt 50 from apertures 51 and 52. The jaw supports 12 and 13 can then be swung down into vertical position as illustrated by the dotted lines in Fig. 3.

When swung into this position the jaw support 13 is swung into vertical operating position so that aperture 52 is in alignment with supporting arm aperture 51a and the nut and bolt are then inserted through said apertures 52 and 51a and threaded together in locking arrangement thereby fastening rotatable jaw support 13 to stationary support arm 40.

When in this vertical operating position the same spring and post will keep the jaw supports spaced from each other when in non-operating position but will permit the jaw supports with their respective jaws 10 and 11 to close when in operation.

It will now be appreciated that there has been provided a novel heat-sealing apparatus, particularly adapted for long seams and closures, in which multiple heating units insure a uniform heating of the facing bar, the apparatus being further characterized by adjustability so as to be usable in any position from horizontal to vertical together with having the facing bar detachably secured thereto as before described.

The subject-matter of the present application was embodied and a part of my application Ser. No. 516,936, now abandoned.

Having now particularly described and ascertained the nature of my said invention, and what manner the same is to be performed, I declare that what I claim is:

1. A heat sealing machine including in combination a supporting structure having an offset apertured supporting arm, a fixed shaft mounted in the apertured portion of said arm, two jaws mounted for swinging adjustment upon said shaft and capable of having their outer spaced ends disposed in fixed adjusted operable positions at right angles from a horizontal to a depending vertical position, means associated with one of the jaws and the supporting arm to lock the jaws in either position, cooperating compressing and heat sealing means carried in the free ends of said jaws, a spring for biasing one jaw away from the other, and means for moving said spring biased jaw in to heat sealing closed position.

2. A heat sealing machine as claimed in claim 1, wherein one of the jaws is a movable jaw.

3. A heat sealing machine as claimed in claim 1, wherein one of the jaws is a movable jaw and the fixed jaw is provided with means to secure one end of the spring.

4. A heat sealing machine as claimed in claim 1, wherein the means to lock the jaws in either selected position comprises cooperative means carried by one jaw and the supporting structure.

5. A heat sealing machine as claimed in claim 1, wherein one of the jaws is a fixed jaw, and where the locking means fastens the fixed jaw in either selected position.

HARRY F. WATERS.

REFERENCES CITED

The following references are of record in the file of this patent:

UNITED STATES PATENTS

| Number | Name | Date |
| --- | --- | --- |
| 1,948,570 | Ferenci | Feb. 27, 1934 |
| 2,189,431 | Moore | Feb. 6, 1940 |
| 2,305,010 | Kenney et al. | Dec. 15, 1942 |
| 2,395,387 | Fry et al. | Feb. 26, 1946 |
| 2,414,157 | Marziani | Jan. 14, 1947 |
| 2,441,817 | Huff | May 18, 1948 |
| 2,510,772 | Cahn | June 6, 1950 |